(12) United States Patent
Heckes et al.

(10) Patent No.: US 11,287,941 B2
(45) Date of Patent: Mar. 29, 2022

(54) METHOD FOR OPERATING A HOUSEHOLD APPLIANCE AND HOUSEHOLD APPLIANCE

(71) Applicant: BSH Hausgeräte GmbH, Munich (DE)

(72) Inventors: Matthias Heckes, Munich (DE); Ersin Isbilen, Lauingen (DE); Stefano Frattesi, Munich (DE); Claudia Häpp, Vaterstetten (DE); Bernd Kränzle, Dischingen (DE); Paula Lloreda Puente, Munich (DE)

(73) Assignee: BSH Hausgeräte GmbH, Munich (DE)

( * ) Notice: Subject to any disclaimer, the term of this patent is extended or adjusted under 35 U.S.C. 154(b) by 60 days.

(21) Appl. No.: 16/647,035

(22) PCT Filed: Sep. 11, 2018

(86) PCT No.: PCT/EP2018/074377
§ 371 (c)(1),
(2) Date: Mar. 13, 2020

(87) PCT Pub. No.: WO2019/057538
PCT Pub. Date: Mar. 28, 2019

(65) Prior Publication Data
US 2020/0253456 A1     Aug. 13, 2020

(30) Foreign Application Priority Data
Sep. 21, 2017   (DE) .................... 10 2017 216 760.2

(51) Int. Cl.
*A47L 15/42*   (2006.01)
*D06F 34/28*   (2020.01)
(Continued)

(52) U.S. Cl.
CPC ........ *G06F 3/0481* (2013.01); *A47L 15/4293* (2013.01); *D06F 34/28* (2020.02);
(Continued)

(58) Field of Classification Search
CPC .......... G06F 9/451; G06F 3/0481; G06F 8/38; A47J 31/52; A47J 36/32; A47L 15/4293;
(Continued)

(56) References Cited

U.S. PATENT DOCUMENTS 9,113,749 B2 * 8/2015 Castellani ............ G06Q 20/327
9,204,778 B2 12/2015 Jerg et al.
(Continued)

OTHER PUBLICATIONS

International Search Report PCT/EP2018/074377 dated Dec. 5, 2018.
National Search Report DE 102017216760.2 dated Jul. 13, 2018.

*Primary Examiner* — Benjamin L Osterhout
(74) *Attorney, Agent, or Firm* — Michael E. Tschupp; Andre Pallapies; Brandon G. Braun (57) ABSTRACT

In a method for operating a household appliance having a user interface for operation of the household appliance by a plurality of users, a number of predetermined usage actions of a particular user of the plurality of users when operating the household appliance is registered in a user-specific manner, and a user-specific control surface is provided by way of the user interface for the particular user on the basis of the usage actions of the particular user as registered in a user-specific manner.

13 Claims, 3 Drawing Sheets

(51) Int. Cl.
  *D06F 33/00* (2020.01)
  *G06F 3/0481* (2022.01)
  *A47L 15/00* (2006.01)
  *F24C 7/08* (2006.01)
  *D06F 101/00* (2020.01)

(52) U.S. Cl.
  CPC ....... *A47L 15/0063* (2013.01); *A47L 2401/20* (2013.01); *A47L 2501/26* (2013.01); *D06F 2101/00* (2020.02); *F24C 7/082* (2013.01)

(58) Field of Classification Search
  CPC ............. A47L 15/0063; A47L 2501/26; A47L 2301/08; A47L 2401/20; D06F 33/00; D06F 34/28; D06F 2101/00; F25D 29/00; F25D 2400/361; F24C 7/082
  See application file for complete search history.

(56) References Cited

U.S. PATENT DOCUMENTS

| | | |
|---|---|---|
| 2007/0271512 A1 | 11/2007 | Knight |
| 2008/0235613 A1 | 9/2008 | Ricklefs et al. |
| 2010/0320189 A1* | 12/2010 | Buchheit .............. H05B 6/6441 219/488 |
| 2011/0120316 A1 | 5/2011 | Castellani et al. |
| 2019/0004690 A1 | 1/2019 | Geyer et al. |
| 2019/0053332 A1* | 2/2019 | Cheng .................... H05B 6/668 |

* cited by examiner

METHOD FOR OPERATING A HOUSEHOLD APPLIANCE AND HOUSEHOLD APPLIANCE

CROSS-REFERENCES TO RELATED APPLICATIONS

This application is the U.S. National Stage of International Application No. PCT/EP2018/074377, filed Sep. 11, 2018, which designated the United States and has been published as International Publication No. WO 2019/057538 A1 and which claims the priority of German Patent Application, Serial No. 10 2017 216 760.2, filed Sep. 21, 2017, pursuant to 35 U.S.C. 119(a)-(d).

BACKGROUND OF THE INVENTION

The present invention relates to a method for operating a household appliance having a user interface for the operation of the household appliance by a plurality of users and to such a household appliance.

Household appliances such as by way of example household dishwashers have a user interface for the operation of the household appliance. For example, such a user interface comprises a number of control knobs by means of which the user may control the household appliance. For the example of a household dishwasher as a household appliance, the user may select a predetermined program or rinsing program via the control knob.

However, a household appliance is traditionally used by a multiplicity of users, by way of example by the members of a family. The user interface is intuitively different for the different users, by way of example the members of a family. Furthermore, the different users also utilize a household appliance differently. By way of example, one user primarily selects an eco-program of a dishwasher, whereas the other users rarely use this eco-program or never use said program.

Consequently, the operation of the household appliance by means of the one user interface is not only intuitively different for the different users but is also encumbered with various degrees of complexity and as a result is also prone to different types of errors.

BRIEF SUMMARY OF THE INVENTION

On this background, an object of the present invention is to improve the operation of a household appliance having a user interface for the operation of the household appliance by a plurality of users.

In accordance with one aspect, a method for operating a household appliance having a user interface for the operation of the household appliance by a plurality of users is proposed. The method comprises the following steps a) and b):
a) Register in a user-specific manner a number of predetermined usage actions of a particular user of the plurality of users when operating the household appliance, and
b) Provide a user-specific control surface by way of the user interface for the particular user on the basis of the usage actions of the particular user as registered in a user-specific manner.

By virtue of providing a user-specific control surface for the particular user of the household appliance, it is possible to reduce the probability of the particular user incorrectly operating said household appliance. For this purpose in detail: if the control surface is customized to suit the particular user on the basis of the particular user-specific usage actions, then the control surface for the particular user is more intuitive and is customized to suit for example the most frequent usage actions of the particular user. By way of example, the control surface may be customized to suit in such a manner that the control surface prioritizes a frequent usage action of a specific user, by way of example in a control menu that is displayed in a higher hierarchical level or in contrasting colors or graphics. By virtue of reducing the probability of the user incorrectly operating the household appliance, the operation of said household appliance is also improved with respect to efficiency, by way of example energy consumption.

By way of example, it is possible via the customized control surface to offer the user their particularly favorite programs in a prioritized manner or on a higher hierarchical level, to customize pre-selected programs or also to output visually and/or acoustically individual responses of the user by way of the control surface. It is also possible in the case of the user-specific control surface to offer a specific language from a plurality of predetermined languages, in particular in the case of a multilingual household. Furthermore, it is advantageously possible via the user-specific control surface to offer the particular user user-specific tips and tricks for operating the household appliance. Furthermore, it is possible via the user-specific control surface to inform the user of possible operating errors.

Moreover, it is possible on the basis of the usage actions as registered in a user-specific manner to customize the control operation via the control surface in such a manner that particular programs and/or setting options of the household appliance are made available, specific software updates are provided or specific equipment checks are performed on the household appliance, by way of example a diagnostic program.

The user interface of the household appliance comprises by way of example as a control surface a touch-sensitive screen. The touch-sensitive screen may comprise a number or plurality of control elements, by way of example virtual control buttons. Furthermore, the touch-sensitive screen may comprise a number of drop-down menus and display areas. Moreover, the user interface may also comprise haptic control knobs or the like.

In accordance with one embodiment, the control surface of the user interface has a number of control elements, wherein each one of the control elements is allocated at least one function of the household appliance. In so doing, in step a) a procedure is performed so as to register a user-specific actuation and said procedure includes registering which control element or which control elements have been actuated by the particular user over a predetermined time period and/or during a specific sequence of operating actions.

If it is established by way of example during the procedure of registering the actuation that a specific user uses one of the control elements particularly frequently, then this control element may be prioritized by the control surface and/or displayed in a menu on a higher hierarchical level. The advantageous effect resides in the fact that this specific user may use their favorite control element more quickly and consequently with a reduced probability of an operating error.

In accordance with a further embodiment, in step b) the type of display of the respective control element on the control surface is customized in a user-specific manner for the particular user on the basis of the registered user-specific actuation.

In an advantageous manner, the type of display of a control element may be customized by the control surface in a user-specific manner. If by way of example a specific control element is used particularly frequently by a specific user, it is then possible to display this control element on the control surface by way of example in a contrasting color or in an enlarged format.

In accordance with a further embodiment, the predetermined usage actions comprise at least one operating input action of the user so as to control the household appliance, at least one servicing action of the user so as to service the household appliance, at least one loading action of the user so as to load the household appliance and/or at least one unloading action of the user so as to unload the household appliance.

In accordance with a further embodiment, the operating input action of the user so as to control the household appliance is in the form of actuating a control element of the user interface, inputting a voice command into a voice recognition facility of the user interface and/or inputting a gesture command into a gesture recognition facility of the user interface.

In accordance with a further embodiment, the operating input action of the user is in the form of a haptic input, a voice input and/or a gesture input by means of a remote control facility.

By way of example, the user may input a voice command via an app installed on their Smartphone, said voice command being transmitted to the household appliance via a network, by way of example the Internet. The user interface of the household appliance comprises for this purpose a transmission unit that may be coupled to the app via the network.

In accordance with a further embodiment, the at least one servicing action comprises topping up the salt, topping up the rinsing agent and/or cleaning a filter of the household appliance.

It is possible using a level sensor to detect that the salt requires topping up. It is likewise possible using another level sensor to detect that the rinsing agent requires topping up. It is possible by way of example via a change in the through-flow rates or a power consumption of a pump, by way of example the circulating pump of a dishwasher, to detect that the filter requires cleaning.

The servicing action may also be in the form of starting up the machine-cleaning program. By way of example, the user may be reminded by way of a display, by way of example after 30 washing cycles, to start the machine-cleaning program.

In accordance with a further embodiment, in step a) a procedure is performed so as to register a user-specific program selection and during said procedure it is registered which program or which programs the particular user selects from a plurality of predetermined programs so as to control the household appliance by means of the operating input actions over a predetermined time period and/or during a specific sequence of operating actions.

In accordance with a further embodiment, at least one control element of the control surface is customized in a user-specific manner for the particular user on the basis of the registered user-specific program selection, said control element being allocated to one or more of the predetermined programs.

In accordance with a further embodiment, in step a) a procedure is performed so as to register a user-specific servicing action and during said procedure it is registered which servicing actions the particular user has performed from a plurality of predetermined servicing actions so as to service the household appliance over a predetermined time period and/or during a specific sequence of operating actions.

It is possible on the basis of the registered servicing action to customize the control surface in such a manner that specific instructions or recommendations for servicing the household appliance are output to the particular user.

In accordance with a further embodiment, in step a) a procedure is performed so as to register a user-specific loading action and during said procedure it is registered which loading actions and/or unloading actions the particular user has performed over a predetermined time period and/or during a specific sequence of operating actions.

The actions of loading and unloading the household appliance may be registered by way of example via weight sensors. For the example of a dishwasher as a household appliance, the weight sensors may be provided by way of example in the rails of the top basket and/or in the rails of the bottom basket of the dishwasher. Moreover, it is also possible to detect the actions of loading and unloading the dishwasher via the point in time at which the door of the dishwasher is opened.

In accordance with a further embodiment, it is possible in a user-specific manner to combine the procedures of registering the program selection, the servicing action and the loading action in order to accordingly customize the control surface for the user.

In accordance with a further embodiment, at least one display in a display area of the control surface is customized in a user-specific manner for the particular user on the basis of the registered user-specific servicing action and/or on the basis of the registered user-specific loading action.

It is possible via the display in the display area of the control surface to provide the user with user-specific instructions and recommendations regarding the handling of the household appliance.

In accordance with a further embodiment, at least one display in a display area of the control surface is customized in a user-specific manner for a second user on the basis of the specific servicing action that is registered for a first user and/or on the basis of the user-specific loading action that is specifically registered for the first user.

If by way of example the first user always performs all servicing actions for a predetermined, by way of example longer, period of time, then it is possible by means of the display for the second user to be reminded to also perform a servicing action once.

In accordance with a further embodiment, the particular user is identified from the plurality of users by means of inputting a predetermined key combination on the user interface, by means of allocating the user to an end device that has the user interface, by means of a voice input for inputting an identification of the particular user, by means of a voice recognition facility for the identification of the user, by means of a facility for recognizing the face of the particular user, by means of a facility for recognizing a finger print of the particular user, by means of a facility for recognizing a hand of the particular user, by means of a facility for recognizing a gesture of the particular user and/or by means of an RFID identification that is associated with the particular user.

By way of example, the particular user may be actively or passively identified via their Smartphone. In the case of passively identifying the user via a Smartphone by way of example Bluetooth or NFC (near field communication) are used.

In accordance with a second aspect, a computer program product is proposed that on a program-controlled facility initiates the implementation of the method in accordance with the first aspect or in accordance with an embodiment of the first aspect.

A computer program product, such as for example computer program resources, may be provided or supplied by way of example as a storage medium, such as for example a memory card, USB stick, CD-ROM, DVD, or also in the form of a down-loadable file from a server in a network. This may be performed by way of example in a wireless communication network by transmitting a corresponding file having the computer program product or the computer program resources.

In accordance with a third aspect, a household appliance is proposed that comprises: a user interface for the operation of the household appliance by a plurality of users, a first unit for the user-specific registration of a number of predetermined usage actions of a particular user of the plurality of users when operating the household appliance and a second unit for controlling the user interface on the basis of the user-specific registration of the usage actions of the particular user in such a manner that said second unit provides a respective user-specific control surface for the particular user.

The household appliance is configured by way of example as a dishwasher, as a cooking appliance, as a refrigeration appliance, as a washing machine, as a kettle or as a coffee machine. The cooking appliance is by way of example an oven, a microwave, a cooker or a steamer. The refrigeration appliance is for example a refrigerator.

The respective unit, in particular the first unit or the second unit, may be implemented in the form of hardware and/or also software. When implemented in the form of hardware, the respective unit may be configured as apparatus or as part of an apparatus, for example as a computer or as a microprocessor or as a control computer. When implemented in the form of software, the respective unit may be configured as a computer program product, as a function, as a routine, as part of a program code or as an executable object.

The embodiments and features that are described for the proposed method apply accordingly for the proposed household appliance.

Further possible implementations of the invention also comprise not explicitly mentioned combinations of features or embodiments that have been previously described or are to be described below with regard to the exemplary embodiments. In so doing, the person skilled in the art will also add individual aspects as improvements or supplements to the respective basic form of the invention.

BRIEF DESCRIPTION OF THE DRAWINGS

Further advantageous embodiments and aspects of the invention are the subject matter of the subordinate claims and also of the exemplary embodiments of the invention described below. The invention is further explained below with reference to the attached figures with the aid of preferred embodiments.

DETAILED DESCRIPTION OF EXEMPLARY EMBODIMENTS OF THE PRESENT INVENTION

Insofar as not otherwise stated, like or like-functioning elements are provided with the same reference numerals in the figures.

Figure 1:
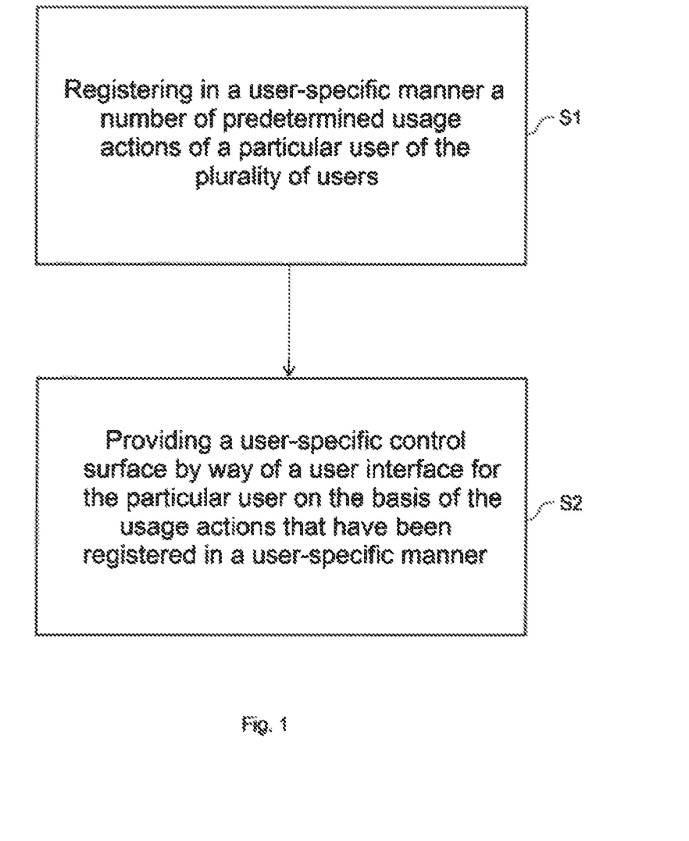
FIG. 1 shows a schematic block diagram of a method for operating a household appliance.

FIG. 1 illustrates a schematic block diagram of a method for operating a household appliance 1.

Figure 2:
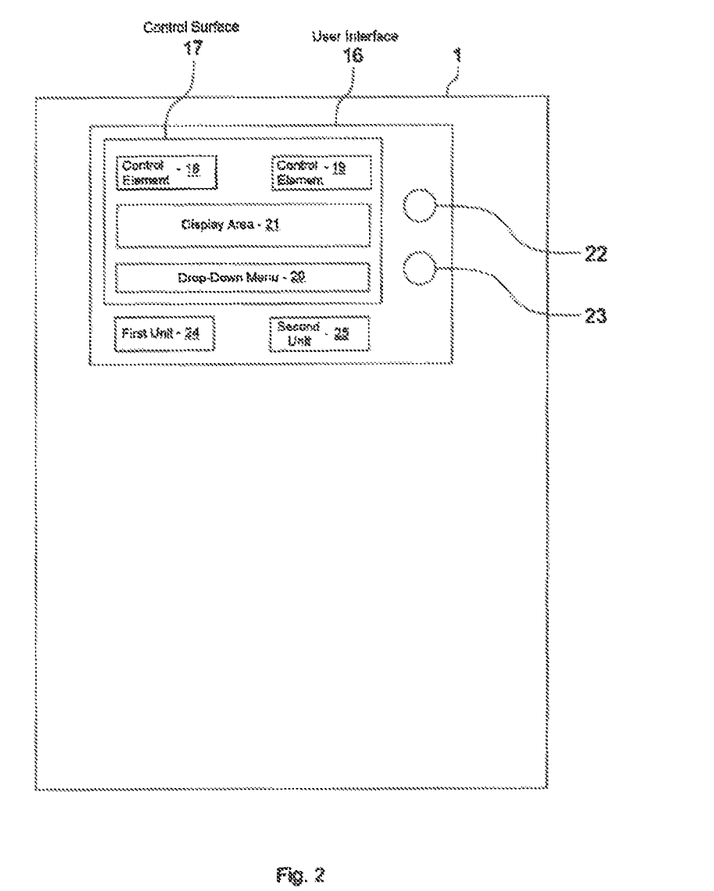
FIG. 2 shows a schematic block diagram of a first exemplary embodiment of a household appliance.

The method illustrated in FIG. 1 is further explained with reference to FIG. 2 that illustrates a schematic block diagram of a first exemplary embodiment of a household appliance 1. The household appliance 1 illustrated in FIG. 2 is by way of example a household dishwasher, a cooking appliance such as for example an oven, a refrigeration appliance such as for example a refrigerator, a washing machine or a coffee machine. The household appliance 1 illustrated in FIG. 2 comprises in addition a user interface 16 that is configured for the operation of the household appliance 1 by a plurality of users. The user interface 16 comprises a control surface 17 that is configured by way of example as a touch-sensitive screen. The control surface 17 comprises control elements 18, 19, a drop-down menu 20 and a display area 21. Without limitation to the generality, the control surface 17 illustrated in FIG. 2 has two control elements 18 and 19 that are configured by way of example as virtual control buttons on the control surface 17. In addition to the control surface 17, the user interface 16 may also comprise a control knob 22, 23.

Referring back to FIG. 1, the exemplary embodiment of the method illustrated in FIG. 1 comprises the following method steps S1 and S2:

In step S1: a number of predetermined usage actions of a particular user of the plurality of users when operating the household appliance 1 is registered in a user-specific manner. In other words, the usage actions of the particular user are registered in a specific manner according to the particular user when operating the household appliance.

In step S2: the control surface 17 is provided in a user-specific manner by the user interface 16 for the particular user on the basis of the usage actions that have been registered in a user-specific manner. In other words, the control surface 17 of the user interface 16 is customized for the particular user. This customization is performed on the basis of the usage actions that are performed by the user when operating the household appliance 1.

With reference to FIG. 2, at least one function of the household appliance 1 is preferably allocated to each one of the control elements 18, 19. It is then possible in step S1 to perform a procedure of registering a user-specific actuation and during this procedure it is registered which control element 18, 19 or which control elements 18, 19 the particular user actuates over a predetermined period of time and/or during a specific sequence of operating actions.

Furthermore, it is possible in step S2 to customize in a user-specific manner the type of display of the respective control element 18, 19 on the control surface 17 for the particular user on the basis of the registered user-specific actuation. If by way of example it is established during the procedure of registering the actuation that a specific user always only or almost exclusively actuates the control element 19 but relatively seldom actuates the control element 18, then it is possible when customizing the type of display to represent the control element 19 for this user in a larger format than for the control element 18 and/or in a contrasting color to that of control element 18.

It is preferred that the usage actions that are registered in step S1 may comprise at least one operating input action of the user so as to control the household appliance 1, at least one servicing action of the user so as to service the household appliance 1, at least one loading action of the user so as to load the household appliance 1 and/or at least one unloading action of the user so as to unload the household appliance 1.

The operating input action of the user so as to control the household appliance 1 is configured by way of example in the form of actuating one of the control elements 18, 19 of the user interface 16, inputting a voice command into a voice recognition facility (not illustrated) of the user interface 16 and/or inputting a gesture command into a gesture recognition facility (not illustrated) of the user interface 16.

For the example of a dishwasher as a household appliance 1, the at least one servicing action may comprise topping up the salt, topping up the rinsing agent and/or cleaning a filter of the dishwasher.

Furthermore, it is possible in step S1 to perform a procedure of registering a user-specific program selection and during said procedure to register which program or which programs the particular user has selected from a plurality of predetermined programs so as to control the household appliance 1 by means of the operating input action over a predetermined period of time and/or during a specific sequence of operating actions. The predetermined period of time may comprise by way of example several days, several weeks but also several months. The specific sequence of operating actions may comprise by way of example a sequence of 10, 20 or 50 operating actions. Furthermore, a control element 18, 19 of the control surface 17 may be customized in a user-specific manner for the particular user on the basis of the registered user-specific program selection, said control element being allocated to one or more of the predetermined programs of the household appliance 1.

Moreover, it is possible in step S1 to perform a procedure of registering a user-specific servicing action and during said procedure it is registered which servicing actions the particular user performs from a plurality of predetermined servicing actions so as to service the household appliance 1 over a predetermined period of time and/or during a specific sequence of operating actions.

Moreover, it is possible in step S1 to perform a procedure of registering a user-specific loading action and during said procedure to register which loading actions and/or unloading actions the particular user performs over a predetermined period of time and/or during a specific sequence of operating actions. For the example of a dishwasher as a household appliance 1, a loading action may comprise by way of example at which point the user preferably loads specific items for washing. The unloading actions may in this case by way of example comprise in which sequence and/or at which point in time the particular user unloads the dishwasher 1.

A display in the display area 21 of the control surface 17 may be customized on the basis of the registered user-specific servicing action and/or on the basis of the registered user-specific loading action. By way of example, the display may comprise specific instructions and recommendations for the servicing, loading and/or the unloading of the household appliance 1.

Prior to performing step S1, the particular user is preferably identified from the plurality of users. This user identification procedure may be a procedure by way of example of inputting a predetermined key combination on the user interface 16, a procedure of allocating the user to an end device (for example a Smartphone) that has the user interface 16, a procedure of inputting a voice for inputting an identification of the user, a procedure of voice recognition for the identification of the user, a procedure of recognizing the face of the user, a procedure of recognizing a finger print of the user, a procedure of recognizing a hand of the user, a procedure of recognizing a gesture of a user and/or a procedure using an RFID identification of the user.

As stated above, FIG. 2 illustrates a schematic block diagram of a household appliance 1. In addition to the above explained features, the user interface 16 of the household appliance 1 illustrated in FIG. 2 comprises a first unit 24 and a second unit 25. The first unit 24 is configured so as to register in a user-specific manner a number of predetermined operating actions of the particular user when operating the household appliance 1. The second unit 25 is configured so as on the basis of the usage actions that are registered in a user-specific manner to control the user interface 16 in such a manner that the user interface 16 customizes the control surface 17 in a user-specific manner.

Figure 3:
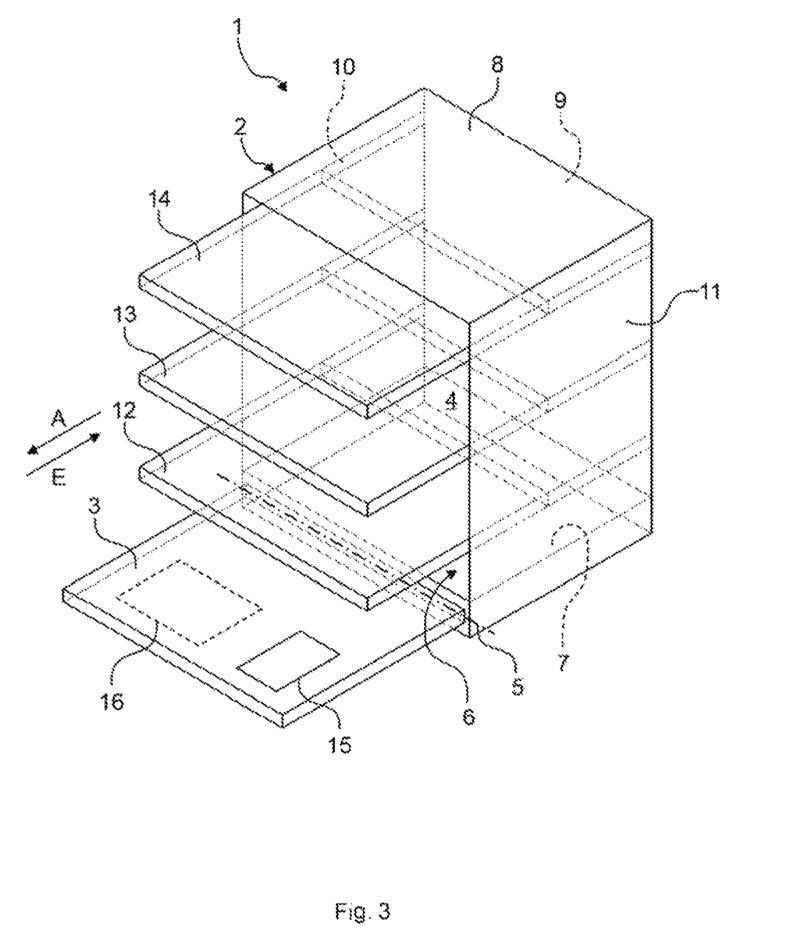
FIG. 3 shows a schematic perspective view of a second exemplary embodiment of a household appliance.

FIG. 3 illustrates a schematic perspective view of a second exemplary embodiment of a household appliance 1. The household appliance 1 in FIG. 3 is configured as a household dishwasher. The household dishwasher 1 comprises a dishwasher cavity 2 that may be closed in a particularly water-tight manner by a door 3. For this purpose, a sealing facility is provided between the door and the dishwasher cavity 2. It is preferred that the dishwasher cavity 2 has a cuboid shape. The dishwasher cavity 2 may be arranged in a housing of the household dishwasher 1. The dishwasher cavity 2 and the door 3 may form a dishwasher chamber 4 for washing items that are to be washed.

The door 3 is illustrated in FIG. 3 in its open position. The door 3 may be closed or opened by pivoting about a pivot axis 5 that is provided on a lower end of the door 3. With the aid of the door 3, it is possible to close or open an opening 6 that is provided in the dishwasher cavity 2 for loading said dishwasher cavity. The dishwasher cavity 2 comprises a base 7, a top wall 8 that is arranged opposite the base 7, a rear wall 9 that is arranged opposite the closed door 3 and two side walls 10, 11 that are arranged opposite one another. The base 7, the top wall 8, the rear wall 9 and the side walls 10, 11 may be manufactured by way of example from a stainless steel sheet. Alternatively, by way of example the base 7 may be manufactured from a synthetic material.

A control apparatus 15 is arranged on the door 3. The control apparatus 15 is configured so as to control the household dishwasher 1, in particular for implementing the washing programs. For this purpose, the control apparatus 15 controls different units (not illustrated here) of the household dishwasher 1, said units being by way of example valves, a pump and/or a heating coil, according to the specifications of a selected washing program.

Moreover, the household dishwasher 1 comprises at least one facility 12 to 14 for receiving items to be washed. It is preferred that multiple, by way of example three, facilities 12 to 14 for receiving items to be washed are provided, wherein the facility 12 for receiving items to be washed may be a lower facility for receiving items to be washed or a bottom basket, the facility 13 for receiving items to be washed may be an upper facility for receiving items to be washed or a top basket and the facility 14 for receiving items to be washed may be a cutlery drawer. As is further illustrated in FIG. 1, the facilities 12 to 14 for receiving items to be washed are arranged one above the other in the dishwasher cavity 2. Each facility 12 to 14 for receiving items to be washed may be selectively moved into or removed from the dishwasher cavity 2. In particular, each facility 12 to 14 for receiving items to be washed may be slid into the dishwasher cavity 2 in an insertion direction E and may be removed from the dishwasher 2 in a removal direction A in the opposite direction to the insertion direction E.

Moreover, the household dishwasher 1 comprises a user interface 16 for the operation of the household dishwasher 1 by a plurality of users.

The user interface 16 of the household dishwasher 1 is configured by way of example as illustrated in FIG. 2 and as described with reference to FIG. 2.

Although the present invention has been described with the aid of exemplary embodiments, it may be modified in numerous ways.

The invention claimed is:

1. A method of operating a household appliance comprising a dishwasher and having a user interface for operation of the dishwasher by a plurality of users, said method comprising:
   a) registering in connection with a particular user a plurality of predetermined usage actions of the particular user of the plurality of users when operating the dishwasher; and
   b) providing a user-specific control surface by way of the user interface for the particular user on the basis of the usage actions of the particular user as registered,
   wherein the user-specific control surface of the user interface has a number of control elements, and further comprising allocating each one of the control elements at least one function of the dishwasher, wherein the step a) includes performing a procedure to register a user-specific actuation and registering during the procedure which control element or which control elements the particular user has actuated over a predetermined time period and/or during a specific sequence of operating actions,
   wherein the step b) includes customizing a type of display of the respective control element on the user specific control surface for the particular user on the basis of the registered user-specific actuation, and
   wherein on condition that a specific control element is used more frequently than other control elements by the particular user, the user interface then displays the specific control element on the user-specific control surface in at least one of a contrasting color or in an enlarged format.

2. The method of claim 1, wherein the predetermined usage actions comprise a member selected from at least one of an operating input action of the user to control the household appliance, a servicing action of the user to service the household appliance, a loading action of the user to load the household appliance, an unloading action of the user to unload the household appliance, or any combination thereof.

3. The method of claim 2, wherein the operating input action of the user is configured by an action selected from at least one of actuating a control element of the user interface, inputting a voice command into a voice recognition facility of the user interface, inputting a gesture command into a gesture recognition facility of the user interface, or any combination thereof.

4. The method of claim 2, wherein the step a) includes performing a procedure to register a user-specific program selection and registering during the procedure which program or which programs the particular user selects from a plurality of predetermined programs so as to control the household appliance in response to the operating input action over a predetermined time period and/or during a specific sequence of operating actions.

5. The method of claim 4, further comprising customizing at least one of the control elements of the control surface in a user-specific manner for the particular user on the basis of the registered user-specific program selection, and allocating the at least one of the control elements to one or more of the plurality of predetermined programs.

6. The method of claim 2, wherein the step a) includes performing a procedure to register a user-specific loading action and registering during the procedure which the loading action and/or the unloading action the particular user has performed over a predetermined time period and/or during a specific sequence of operating actions.

7. The method of claim 6, further comprising customizing at least one display in a display area of the control surface customized in a user-specific manner for the particular user on the basis of the registered user-specific loading action.

8. The method of claim 1, further comprising identifying the particular user from the plurality of users by a member selected from at least one of inputting a predetermined key combination on the user interface, allocating the user to an end device that has the user interface, a voice input for inputting an identification of the particular user, a voice recognition facility for identification of the particular user, a facility for recognizing the face of the particular user, a facility for recognizing a finger print of the particular user, a facility for recognizing a hand of the particular user, a facility for recognizing a gesture of the particular user, an RFID identification that is associated with the particular user, or any combination thereof.

9. A method of operating a household appliance comprising a dishwasher and having a user interface for operation of the dishwasher by a plurality of users, said method comprising:
   a) registering in connection with a particular user a plurality of predetermined usage section of the particular user of the plurality of users when operating the dishwasher; and
   b) providing a user-specific control surface by way of the user interface for the particular user on the basis of the usage actions of the particular user as registered,
   wherein the predetermined usage actions comprise a member selected from at least one of an operating input action of the user to control the dishwasher, a servicing action of the user to service the dishwasher, a loading action of the user to load the dishwasher, an unloading action of the user to unload the dishwasher, or any combination thereof, and
   wherein the servicing action comprises a member selected from at least one of topping up a salt, topping up a rinsing agent, cleaning a filter of the dishwasher, or any combination thereof.

10. A method of operating a household appliance having a user interface for operation of the household appliance by a plurality of users, said method comprising:
   a) registering in connection with a particular user a plurality of predetermined usage actions of the particular user of the plurality of users when operating the household appliance; and
   b) providing a user-specific control surface by way of the user interface for the particular user on the basis of the usage actions of the particular user as registered,
   wherein the predetermined usage actions comprise a member selected from at least one of an operating input action of the user to control the household appliance, a servicing action of the user to service the household appliance, a loading action of the user to load the household appliance, an unloading action of the user to unload the household appliance, or any combination thereof, and wherein the step a) includes performing a procedure to register a user-specific servicing action from a plurality of predetermined servicing actions and registering during the procedure the servicing action the particular user has performed to service the household appliance over a predetermined time period and/or during a specific sequence of operating actions.

11. The method of claim 10, further comprising customizing at least one display in a display area of the control surface customized in a user-specific manner for the particular user on the basis of the registered user-specific servicing action.

12. A computer program product for operating a household appliance comprising a dishwasher and having a user interface for operation of the dishwasher by a plurality of users, said computer program product comprising a computer program embodied in a non-transitory computer readable medium, wherein the computer program, when loaded into a program-controlled facility and executed by the program-controlled facility, causes the program-controlled facility to perform the steps of:
  a) registering in connection with a particular user a plurality of predetermined usage actions of the particular user of the plurality of users when operating the dishwasher; and
  b) providing a user-specific control surface by way of the user interface for the particular user on the basis of the usage actions of the particular user as registered,
  wherein the user-specific control surface of the user interface has a number of control elements, and further comprising allocating each one of the control elements at least one function of the dishwasher, wherein the step a) includes performing a procedure to register a user-specific actuation and registering during the procedure which control element or which control elements the particular user has actuated over a predetermined time period and/or during a specific sequence of operating actions,
  wherein the step b) includes customizing a type of display of the respective control element on the user-specific control surface for the particular user on the basis of the registered user-specific actuation, and
  wherein on condition that a specific control element is used more frequently than other control elements by the particular user, the user interface then displays the specific control element on the user-specific control surface in at least one of a contrasting color or in an enlarged format.

13. A household appliance comprising a dishwasher, comprising:
  a user interface for operating the dishwasher by a plurality of users;
  a first unit configured to execute a user-specific registration of a plurality of predetermined usage actions of a particular user of the plurality of users when operating the dishwasher; and
  a second unit configured to control the user interface on the basis of the user-specific registered usage actions of the particular user in such a manner that the second unit provides a respective user-specific control surface for the particular user,
  wherein the user-specific control surface of the user interface has a number of control elements, and further comprising allocating each one of the control elements at least one function of the dishwasher, wherein the first unit is configured to perform a procedure to register a user-specific actuation and registering during the procedure which control element or which control elements the particular user has actuated over a predetermined time period and/or during a specific sequence of operating actions,
  wherein the second unit is configured to customizing a type of display of the respective control element on the user-specific control surface for the particular user on the basis of the registered user-specific actuation, and
  wherein on condition that a specific control element is used more frequently than other control elements by the particular user, the user interface then displays the specific control element on the user-specific control surface in at least one of a contrasting color or in an enlarged format.

\* \* \* \* \*